(12) United States Patent
Oitaka et al.

(10) Patent No.: US 8,776,491 B2
(45) Date of Patent: Jul. 15, 2014

(54) LIFTING ENGAGEMENT CHAIN UNIT

(75) Inventors: Michio Oitaka, Osaka (JP); Takahisa Ando, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 299 days.

(21) Appl. No.: 13/340,303

(22) Filed: Dec. 29, 2011

(65) Prior Publication Data

US 2012/0167542 A1   Jul. 5, 2012

(30) Foreign Application Priority Data

Jan. 5, 2011   (JP) ................... 2011-000574

(51) Int. Cl.
*B66F 3/00* (2006.01)
*B66F 3/02* (2006.01)
*B66F 7/12* (2006.01)

(52) U.S. Cl.
USPC ............... 59/78; 59/84; 474/152; 474/217; 254/358; 254/372

(58) Field of Classification Search
USPC ........ 59/78, 84; 474/152, 153, 202, 217, 251; 254/97, 133 R, 358, 372
See application file for complete search history.

(56) References Cited

U.S. PATENT DOCUMENTS

| | | | | |
|---|---|---|---|---|
| 3,645,146 A | * | 2/1972 | Nagin ................. | 254/133 R |
| 5,355,643 A | * | 10/1994 | Bringolf ............... | 52/108 |
| 6,500,084 B2 | * | 12/2002 | Wigsten ............... | 474/156 |
| 6,575,861 B2 | * | 6/2003 | Markley et al. ........ | 474/156 |
| 7,270,619 B2 | * | 9/2007 | Bourc'His ............. | 474/202 |
| 8,069,954 B2 | * | 12/2011 | Kempf ................ | 254/97 |
| 8,328,670 B2 | * | 12/2012 | Suko et al. ........... | 474/152 |
| 8,341,931 B2 | * | 1/2013 | Ando et al. ........... | 59/78 |
| 8,500,101 B2 | * | 8/2013 | Yaoi et al. ............ | 254/372 |

FOREIGN PATENT DOCUMENTS

JP            11-278797 A        10/1999

* cited by examiner

*Primary Examiner* — David B Jones
(74) *Attorney, Agent, or Firm* — Maschoff Brennan

(57) ABSTRACT

There is provided a lifting engagement chain unit that autonomously erects a pair of engagement chains, ensures engagement accuracy between link plates and improves buckling strength. A plurality of buckling restricting attachment plates is arrayed along an outer surface of the engagement chains in a chain longitudinal direction.

9 Claims, 8 Drawing Sheets

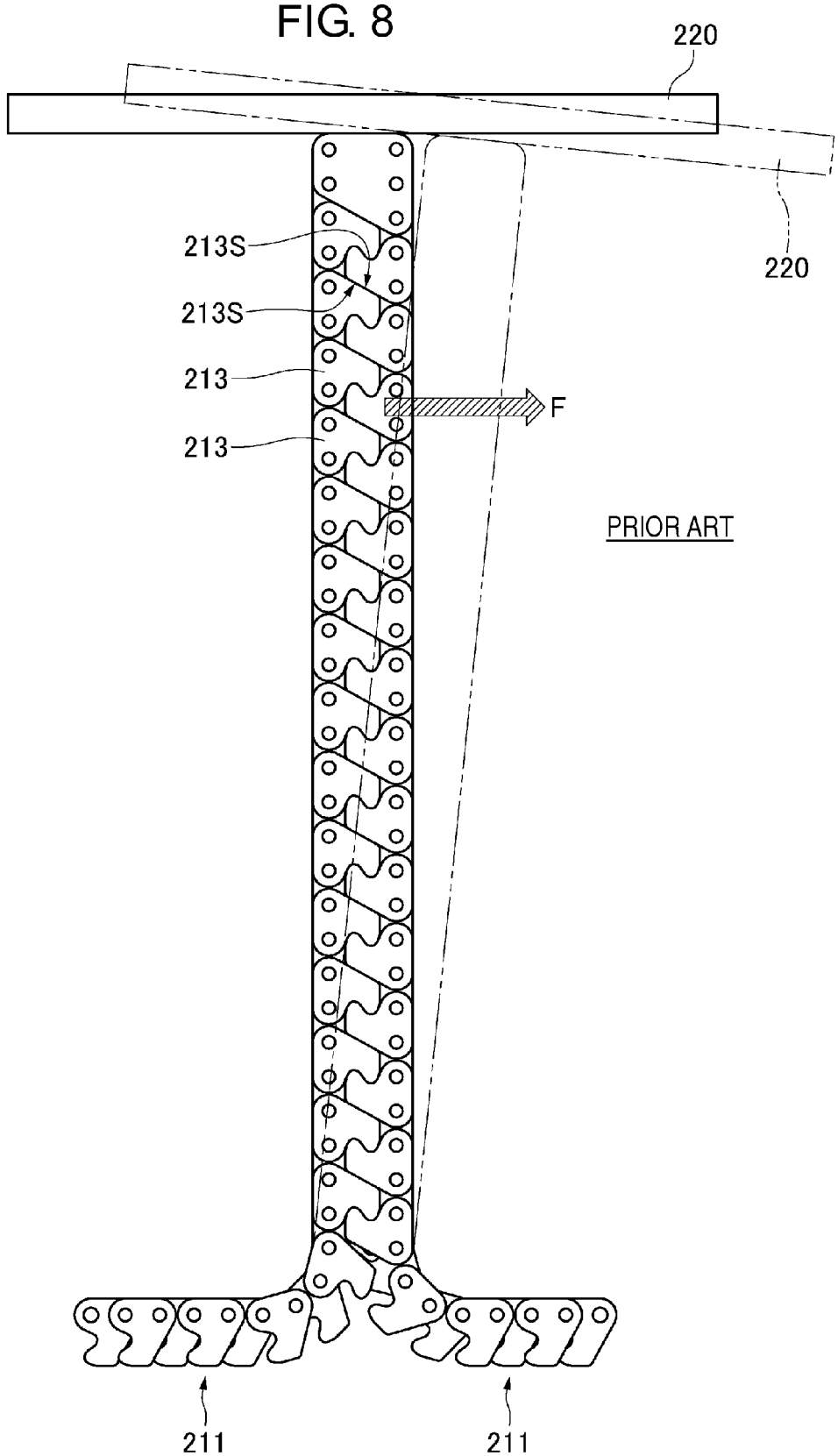

LIFTING ENGAGEMENT CHAIN UNIT

CROSS REFERENCE TO RELATED APPLICATIONS

This application claims the foreign priority benefit under Title 35, United States Code, §119(a)-(d) of Japanese Patent Application No. 2011-000574, filed on Jan. 5, 2011 in the Japan Patent Office, the disclosure of which is herein incorporated by reference in its entirety.

BACKGROUND OF THE INVENTION

1. Field of the Invention

The present invention relates to a lifting engagement chain unit assembled in a lifting apparatus used in a manufacturing facility in the field of various manufacturing industries, in a transport facility in the field of transportation, in a nursing facility in the field of medical and welfare industries, in a stage facility in the field of performing art and the like to lift an object from an installation surface.

2. Related Art

Hitherto, there is known a lifting apparatus for lifting an object which uses a pair of engagement chains which are lifted by rotating a driving sprocket that engages with the engagement chains as disclosed in Japanese Patent Application Laid-open No. Hei. 11-278797. See the claims and FIG. 1. As shown in FIG. 8, the engagement chains used in the lifting apparatus described above lift an object (referred to hereinafter as a 'driven object') 220 such as a load supporting member. The driven object 220 is lifted as flat plate end planes 213S, located on the opposite sides from plate engaging planes of link plates 213, contact with each other obliquely with respect to a lifting direction.

One problem with the lifting apparatus described above, however, is that a horizontal component F of a load may be generated as the pair of engagement chains 211 is inclined in lifting the pair of engagement chains 211 by engaging with each other as shown in FIG. 8. Therefore, it becomes difficult to lift the driven object 220 to higher position within a range of a certain chain length by autonomously erecting the pair of engagement chains 211 straightly in a vertical direction. The lifting apparatus also has problems that it may generate a gap between the link plates 213 engaging with each other, may unbalance a burden of the load acting on the respective link plates 213 and may make it difficult to improve buckling strength of the pair of engagement chains 211.

Still more, the inclination of the pair of engagement chains 211 increases even more and the buckling strength also drops in the condition in which the horizontal component F of the load is increased by continuously causing the load to act on the pair of once inclined engagement chains 211 from an upper part to a lower part in the vertical direction. Therefore, the lifting apparatus described above has other problems that it generates a large amount of work to assemble the apparatus because it requires reinforcing devices for reinforcing the pair of engagement chains 211 be mounted. Also, there is a need for an increased number of parts in the apparatus and an increased size of the engagement chains 211, i.e., a cross-sectional area of the pair of engagement chains 211 integrated by engaging with each other, to assure predetermined buckling strength.

SUMMARY OF THE INVENTION

Accordingly, the present invention aims at solving the aforementioned prior art problems by providing a lifting engagement chain unit that autonomously erects a pair of engagement chains straightly in a vertical direction to lift a driven object to higher position. The present invention prevents engagement accuracy between link plates from dropping, improves buckling strength without increasing the amount of work necessary to assemble the apparatus in which reinforcing devices for reinforcing the pair of engagement chains are mounted, without increasing a number of parts of the apparatus and without increasing a cross-sectional area of the pair of engagement chains when they are engaged with each other.

In order to solve the aforementioned problems, according to a first aspect of the invention, there is provided a lifting engagement chain unit comprising pairs of hooked inner tooth plates separately disposed in a chain width direction, hooked outer tooth plates adjacently disposed respectively on the outsides of the hooked inner tooth plates and pairs of front and rear link pins for linking the hooked inner tooth plates with the hooked outer tooth plates. A pair of engagement chains are each constructed by linking large numbers of the hooked inner tooth plates with the hooked outer tooth plates in the chain longitudinal direction by the link pins. The pair of engagement chains is integrated by being disposed so as to face with each other and engaged with each other and is branched by the pair of engagement chains being disengaged from each other. The lifting engagement chain unit further comprises a plurality of buckling restricting attachment plates arrayed along the chain longitudinal direction. Each has a pair of front and rear buckling restricting planes that restricts buckling of the chain along a counterface surface of the pair of engagement chains when the pair of engagement chains are engaged with each other and the buckling restricting attachment plates are attached respectively only to the outside of the hooked outer tooth plates of one engagement chain.

According to a second aspect of the invention, the buckling restricting attachment plates are linked and fixed to one engagement chain by the link pins included in one engagement chain among the pair of engagement chains.

According to a third aspect of the invention, the buckling restricting plane extends horizontally when the pair of engagement chains are engaged with each other.

According to a fourth aspect of the invention, the buckling restricting plane extends from one engagement chain to the other engagement chain of the pair of engagement chains along a plate plane of the buckling restricting attachment plate and crosses over a center line of the pair of engagement chains when the pair of engagement chains are engaged with each other.

According to a fifth aspect of the lifting engagement chain unit of the invention, the buckling restricting attachment plate overlaps with the two hooked outer tooth plates contained in the other engagement chain and adjoining in the chain longitudinal direction when the pair of engagement chains are engaged with each other.

A sixth aspect of the invention is a lifting engagement chain comprising a first engagement chain and a second engagement chain, each engagement chain including a plurality of chain segments which are linked together by a plurality of link pins. Each chain segment includes a pair of hooked inner tooth plates separately disposed in a chain width direction, a pair of outer tooth plates positioned such that the plurality at least two of pairs of hooked inner tooth plates are disposed between the two hooked outer tooth plates in the chain width direction, and a buckling restricting attachment plate being attached one outside surface of one of the hooked outer tooth plates. The link pins link the pair of inner tooth plates to the pair of outer tooth plates, an adjacent pair of outer tooth plates of an adjacent chain segment in the chain longitudinal direction, and the buckling restricting attachment plate. The first and second engagement chains are adapted so as to be capable of being integrated with each other by being disposed so as to face with each other and engaged with to form an engaged chain each other as the hooked inner tooth plates and hooked outer tooth plates of the first and second engagement chains engage with each other, the first and second of engagement chains also being adapted to disengage from each other and separate. The buckling restriction attachment plates of the first engagement chain are formed on an outer surface of the engaged chain in the chain width direction while the buckling restriction attachment plates of the second engagement chain are formed on another outer surface of the engaged chain in the chain width direction. Each of the buckling restricting attachment plates each has a pair of front and rear buckling restricting planes that restrict buckling of the engaged chain.

In each of the aspects described above, because the lifting engagement chain unit comprises the pairs of hooked inner tooth plates separately disposed in the chain width direction, the hooked outer tooth plates adjacently disposed respectively on the outsides of the pairs of hooked inner tooth plates and the pairs of front and rear link pins for linking the hooked inner tooth plates with the hooked outer tooth plates in the chain longitudinal direction, wherein the pair of engagement chains is constructed by linking the large numbers of hooked inner tooth plates with the hooked outer tooth plates in the chain longitudinal direction by the link pins, the pair of engagement chains can be not only integrated by being disposed so as to face with each other and engaged with each other and can be branched by being disengaged from each other, but also has the following peculiar advantageous effects.

That is, because the lifting engagement chain unit further comprises the plurality of buckling restricting attachment plates arrayed along the chain longitudinal direction and each having the pair of front and rear buckling restricting planes that restrict buckling of the chain along the couterface surface of the pair of engagement chains when the pair of engagement chains are engaged with each other, the buckling restricting planes two adjacent buckling restricting attachment plates in the chain longitudinal direction contact with each other.

Accordingly, the lifting engagement chain unit restricts the pair of engagement chains from inclining along the counter surface of the pair of engagement chains. This enables the driven object to be lifted to a higher position when the pair of engagement chains is autonomously erected straightly in the vertical direction, ensures engagement accuracy of the link plates between the hooked inner tooth plates and the hooked outer tooth plates, and improves buckling strength without increasing a burden assembling the apparatus, without increasing a number of parts and without increasing a cross-sectional area of the pair of engagement chains when they are engaged with each other.

BRIEF DESCRIPTION OF DRAWINGS

FIG. 8 is a front view of a lifting engagement chain unit of a comparative example.

BEST MODE FOR CARRYING OUT THE INVENTION

First Embodiment

A first embodiment of an engagement chain-type lifting apparatus 100 adopting a lifting engagement chain unit 111 of one embodiment of the invention will be explained with reference to FIGS. 1 through 7.

Figure 1:
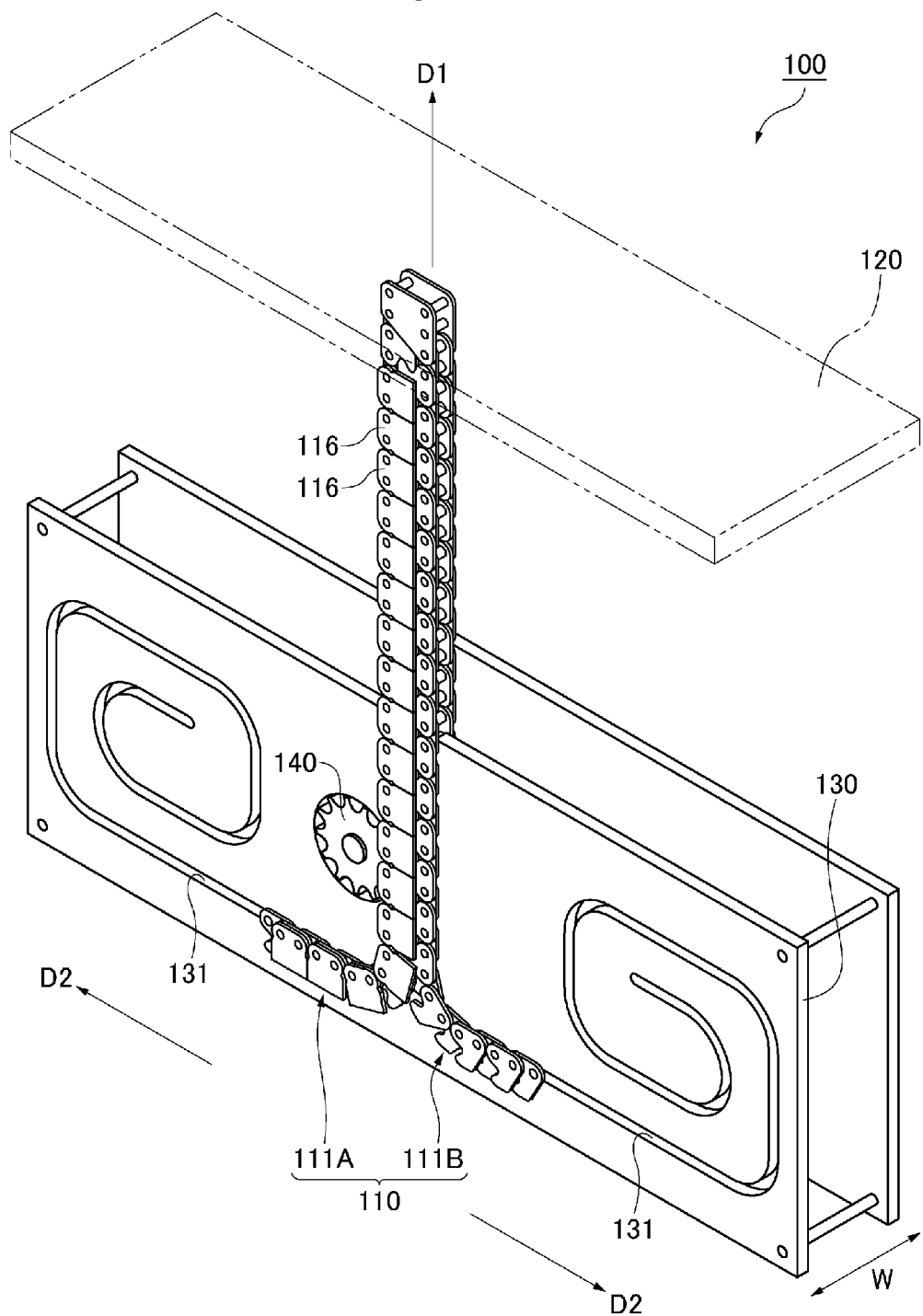
FIG. 1 is a perspective view of an engagement chain-type lifting apparatus adopting a lifting engagement chain unit of one embodiment of the invention.
Figure 2:
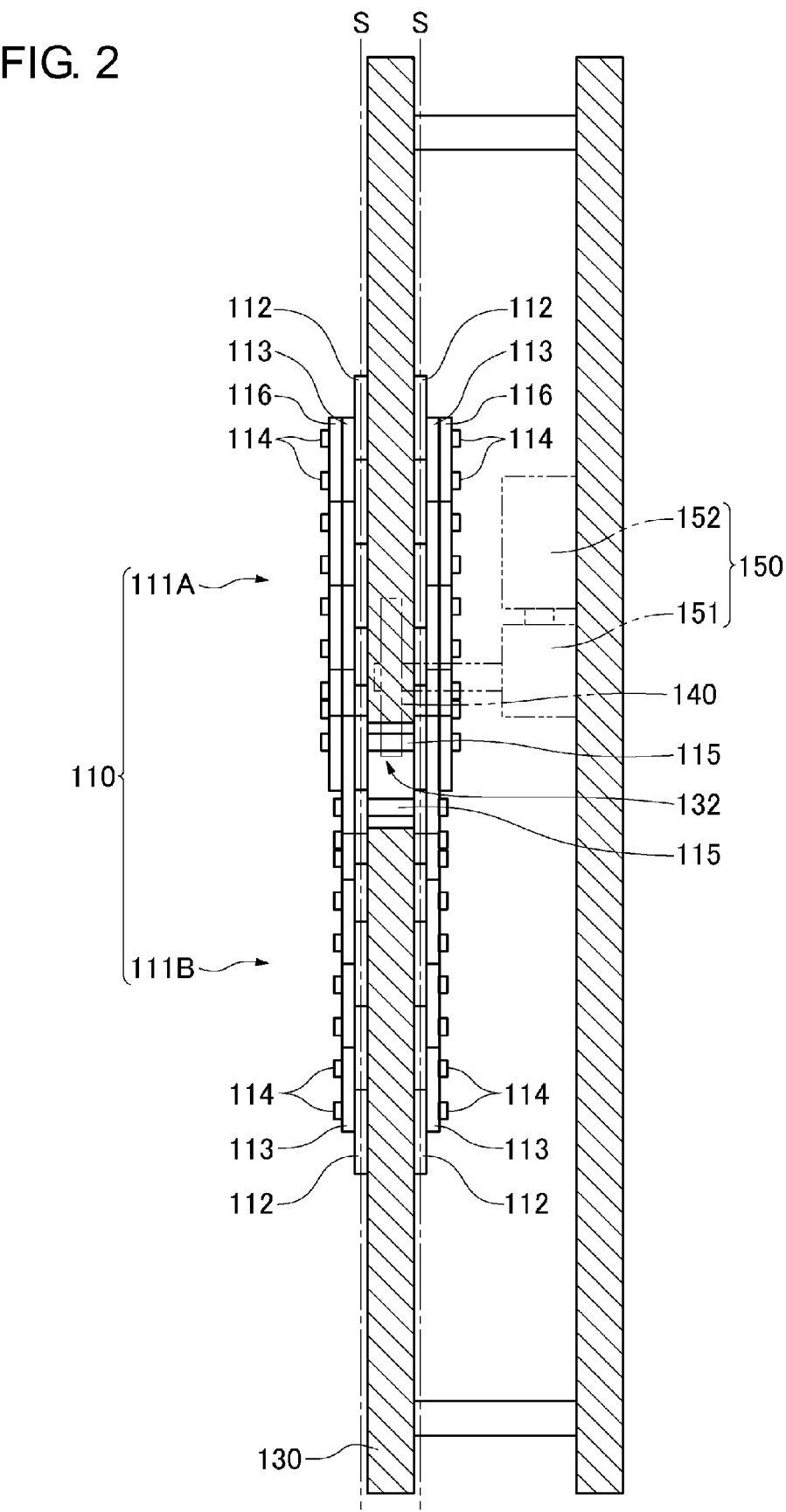
FIG. 2 is a plan view of the engagement chain-type lifting apparatus shown in FIG. 1.
Figure 3:
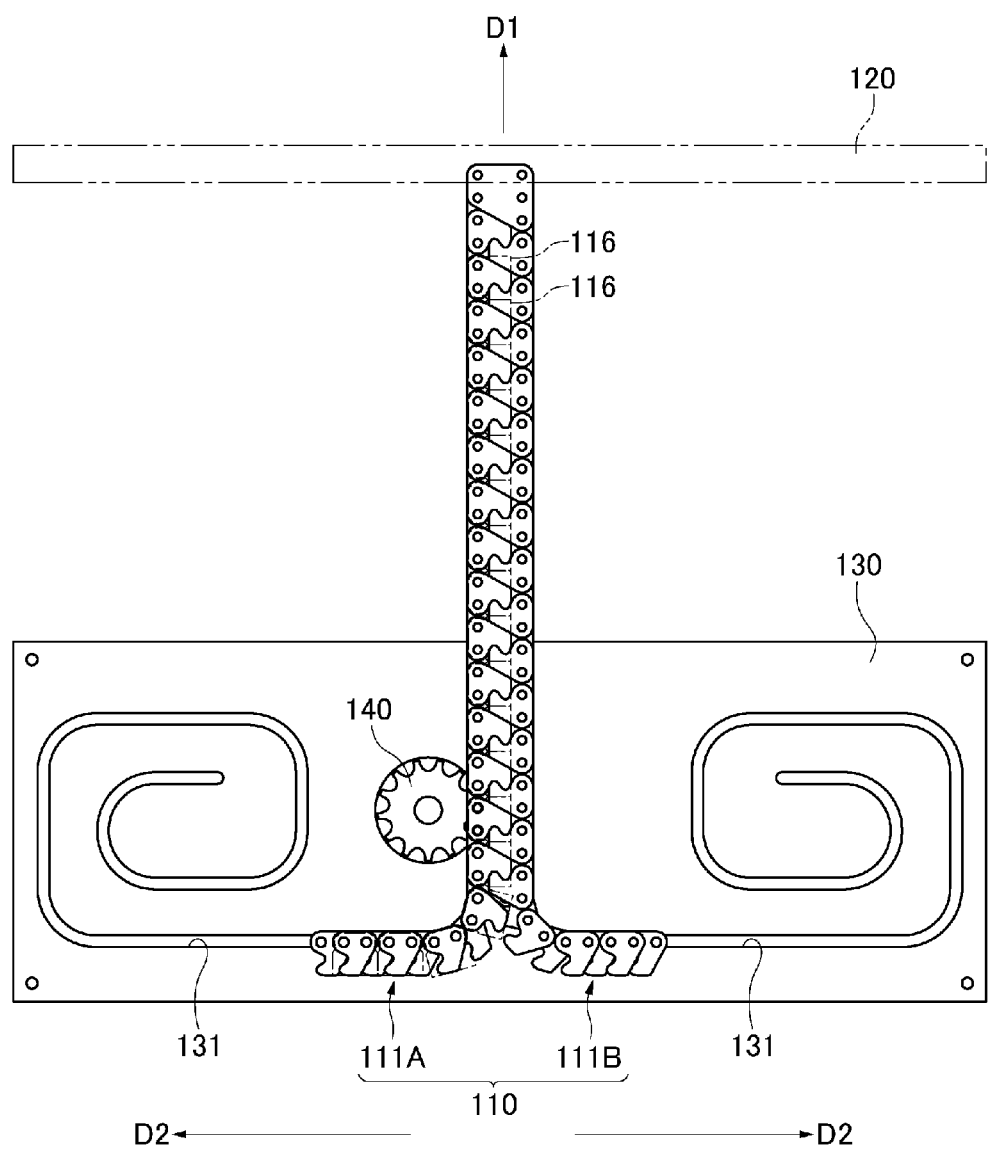
FIG. 3 is a front view of the engagement chain-type lifting apparatus shown in FIG. 1.
Figure 4:
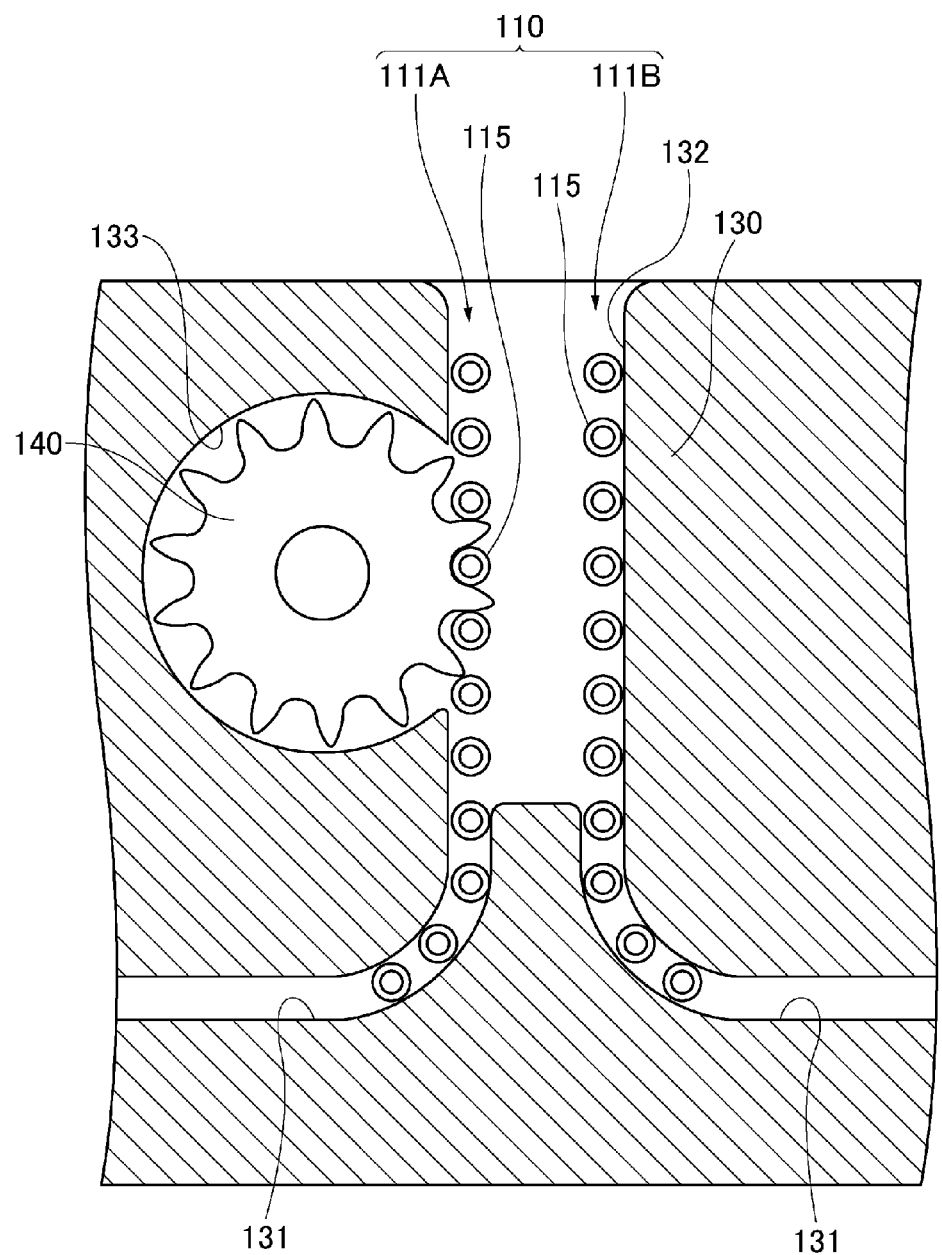
FIG. 4 is an enlarged view of a part near a driving sprocket and engagement chains shown in FIG. 3.
Figure 5:
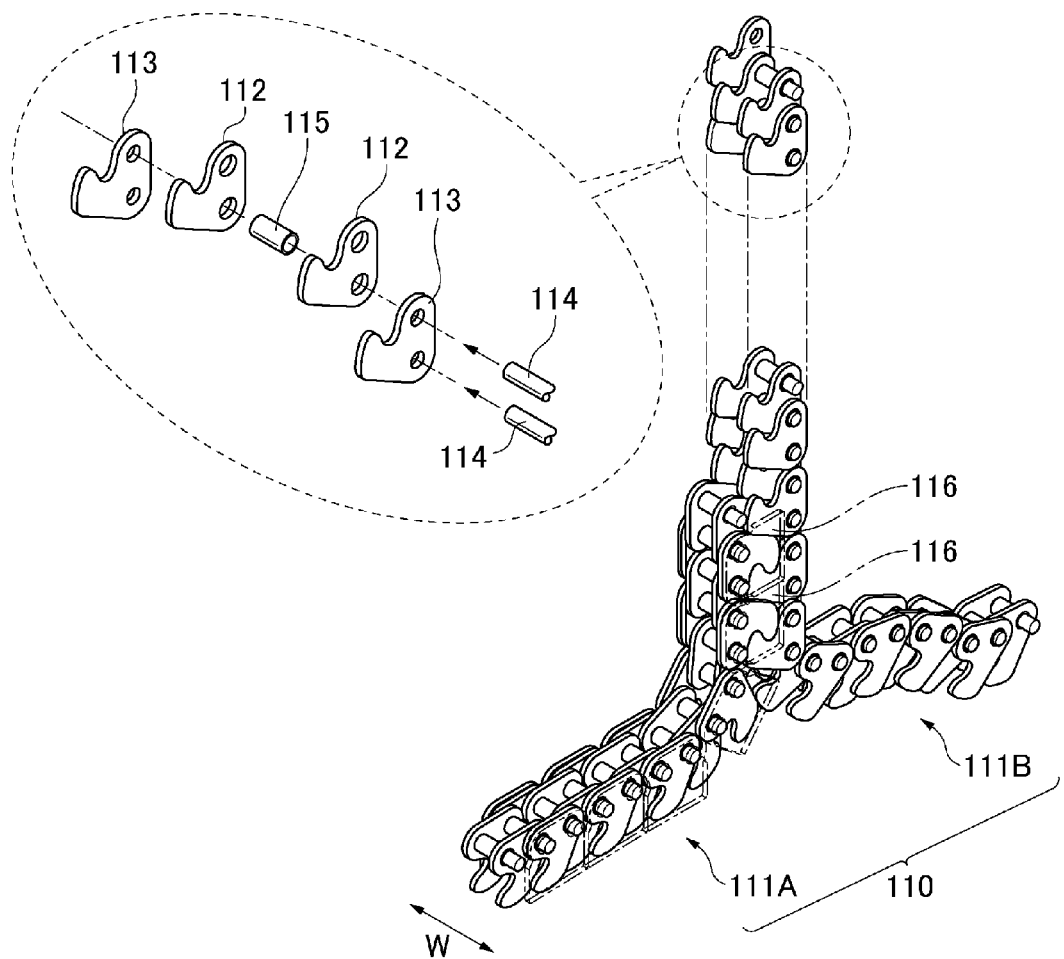
FIG. 5 is a perspective view showing a decomposed state and a disengaged state of the lifting engagement chain unit of one embodiment of the invention.
Figure 6:
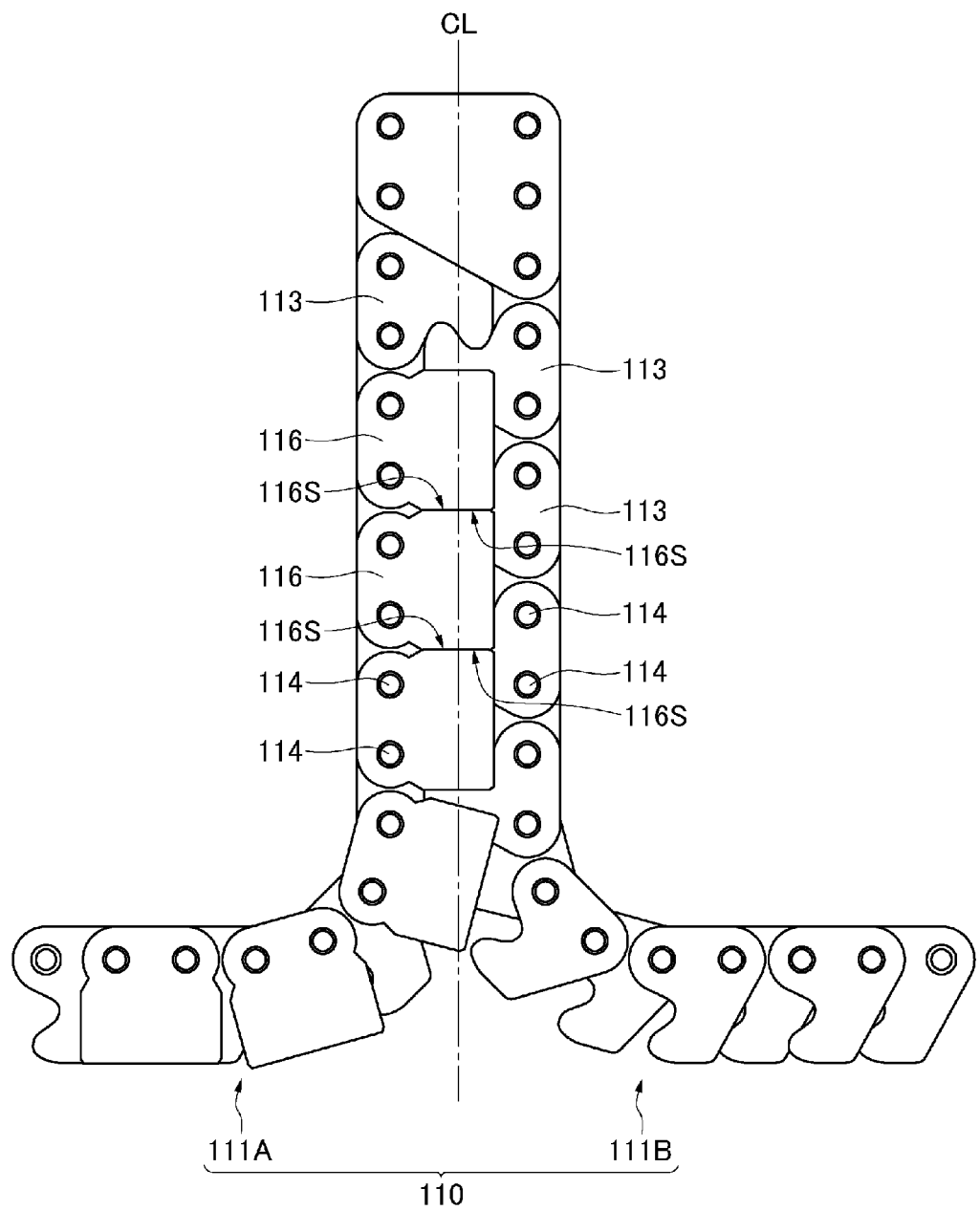
FIG. 6 is a front view of the lifting engagement chain unit of one embodiment of the invention.
Figure 7:
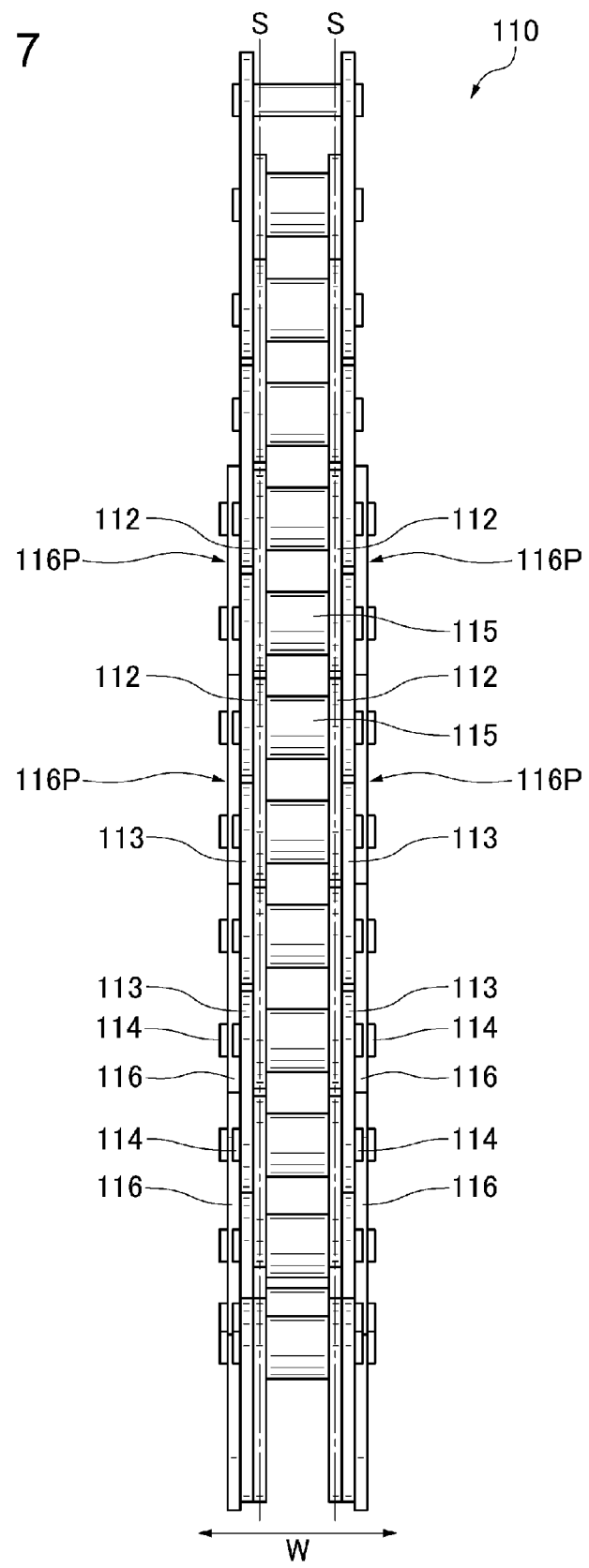
FIG. 7 is a side view of the lifting engagement chain unit of one embodiment of the invention.

Here, FIG. 1 is a perspective view of the engagement chain-type lifting apparatus adopting the lifting engagement chain unit of one embodiment of the invention, FIG. 2 is a plan view of the engagement chain-type lifting apparatus shown in FIG. 1, FIG. 3 is a front view of the engagement chain-type lifting apparatus shown in FIG. 1, FIG. 4 is an enlarged view of a part near a driving sprocket and engagement chains shown in FIG. 3, FIG. 5 is a perspective view showing a decomposed state and a disengaged state of the lifting engagement chain unit of one embodiment of the invention, FIG. 6 is a front view of the lifting engagement chain unit of one embodiment of the invention and FIG. 7 is a side view of the lifting engagement chain unit of one embodiment of the invention.

As shown in FIG. 1, the engagement chain-type lifting apparatus 100 adopting the lifting engagement chain unit 110 of one embodiment of the invention lifts a driven object 120 in a vertical direction by fixing the driven object 120 at an end of the lifting engagement chain unit 110.

Then, as shown in FIGS. 1 through 4, the engagement chain-type lifting apparatus 100 comprises, as its basic unit structure, the lifting engagement chain unit 110 having the pair of engagement chains 111A and 111B, a chain guide plate 130 provided with chain storing grooves 131 for guiding and storing the separated pair of engagement chains 111A and 111B and a chain guiding groove 132 connected to the chain storing groove 131 for guiding the pair of engagement chains 111A and 111B to a rigid position, a driving sprocket 140 stored in a concave driving sprocket storing groove 133 formed in the chain guide plate 130 and opening to a side of the engagement chain 111A to drive the pair of engagement chains 111A and 111B movably in the vertical direction by engaging with the engagement chain 111A and a driving source 150 composed of an orthogonal gear 151 for supplying driving force to the driving sprocket 140 and a driving motor 152. The apparatus is then arranged to guide the pair of engagement chains 111A and 111B vertically in a direction D1 wherein the pair of engagement chains 111A and 111B form a united, rigid body and a branching direction D2 while keeping a rigid condition of the pair of engagement chains 111A and 111B to lift the driven object 120.

Still more, the driving sprocket storing groove 133 opens to the pair of engagement chains 111A and 111B which form a united, rigid body by engaging with each other as shown in FIG. 4 and prevents vertical motions (pulsing motion), vibrations, noises and velocity fluctuation caused by chordal action in the engagement chain-type lifting apparatus 100. Thus, the lifting engagement chain unit 110 erects the pair of engagement chains 111A and 111B autonomously and smoothly by engaging the engagement chains 111A and 111B with each other while reducing vibrations and noises and stabilizing the operation of the chains of the engagement chain-type lifting apparatus 100.

Next, the lifting engagement chain unit 110 of the present embodiment will be explained in detail with reference to FIGS. 1 through 7.

As shown in FIGS. 1 through 5, the lifting engagement chain unit 110 of the present embodiment comprises pairs of hooked inner tooth plates 112 separately disposed in a chain width direction W, hooked outer tooth plates 113 adjacently disposed respectively on outsides of the pairs of hooked inner tooth plates 112, pairs of front and rear link pins 114 for linking the hooked inner tooth plates 112 with the hooked outer tooth plates 113 in a chain longitudinal direction. The pair of engagement chains 111A and 111B is constructed by linking the large number of hooked inner tooth plates 112 with the hooked outer tooth plates 113 in the chain longitudinal direction by the link pins 114.

The pair of engagement chains 111A and 111B is integrated by being disposed so as to face with each other and engaged with each other and is branched by being disengaged from each other.

More specifically, as shown in FIG. 5, the pair of engagement chains 111A and 111B is a so-called chuck chain and comprises the hooked inner tooth plates 112, the hooked outer tooth plates 113 overlapping with the hooked inner tooth plates 112 by being shifted by a half pitch and bushes 115 that connect and fix the hooked inner tooth plates 112 in the chain width direction W and through which the link pins 114 are inserted. The pair of engagement chains 111A and 111B are autonomously erected by the hooked inner tooth plates 112 engaging with the hooked outer tooth plates 113 by being deflected from the branching direction D2 to the rigidifying direction D1 along the chain guide plate 130 described above and is branched by disengaging the hooked inner tooth plates 112 and the hooked outer tooth plates 113 by being deflected from the rigidifying direction D1 to the branching direction D2.

Next, a specific configuration of the structure which is the most characteristic part of the lifting engagement chain unit 110 of the present embodiment will be explained in detail with reference to FIGS. 1 through 7.

As shown in FIGS. 1 through 7, the lifting engagement chain unit 110 of the present embodiment further comprises a plurality of buckling restricting attachment plates 116 arrayed along the chain longitudinal direction and each having a pair of front and rear buckling restricting planes 116S that restrict buckling of the chain along the couterface surface S of the pair of engagement chains 111A and 111B in the condition in which the pair of engagement chains 111A and 111B is integrated by being engaged with each other. The buckling restricting attachment plates 116 are attached respectively only to the outsides of the hooked outer tooth plates 113 of the engagement chain 111A among the pair of engagement chains 111A and 111B.

Then, because the buckling restricting planes 116S of the two buckling restricting attachment plates 116 adjoining in the chain longitudinal direction contact with each other, the lifting engagement chain unit 110 restricts the pair of engagement chains 111A and 111B from inclining from one engagement chain to the other engagement chain along the counter surface S of the pair of engagement chains 111A and 111B.

Accordingly, the lifting engagement chain unit 110 lifts the driven object 120 to a higher position in the condition in which the pair of engagement chains 111A and 111B are autonomously erected straightly in the vertical direction, prevents engagement accuracy of the link plates between the hooked inner tooth plates 112 and between the hooked outer tooth plates 113 from dropping and improves buckling strength without increasing a burden of works in assembling the apparatus in which reinforcing devices for reinforcing the pair of engagement chains 111A and 111B are mounted, without increasing a number of parts and without increasing a cross-sectional area of the integrated pair of engagement chains 111A and 111B.

Still more, the buckling restricting attachment plates 116 are linked and fixed to one engagement chain 111A by the link pins 114 included in one engagement chain 111A among the pair of engagement chains 111A and 111B in the lifting engagement chain unit 110.

Thereby, the whole of the pair of engagement chains 111A and 111B including the plurality of buckling restricting attachment plates 116 becomes one rigid body when the pair of engagement chains 111A and 111B are integrated and engaged with each other.

Accordingly, in this embodiment, the lifting engagement chain unit 110 lifts the driven object 120 to a higher position when the pair of engagement chains 111A and 111B are autonomously erected straightly in the vertical direction while restricting the pair of engagement chains 111A and 111B from inclining along the counter surface S of the pair of engagement chains 111A and 111B. The lifting engagement chain unit 110 also ensures the engagement accuracy of the link plates between the hooked inner tooth plates 112 and between the hooked outer tooth plates 113 and improves the buckling strength without increasing the amount of work required to assemble the apparatus in which the reinforcing devices for reinforcing the pair of engagement chains 111A and 111B are mounted, without increasing the number of parts and without increasing the cross-sectional area of the pair of engagement chains 111A and 111B.

Still more, the buckling restricting plane 116S extends horizontally in the condition in which the pair of engagement chains 111A and 111B are integrated and engaged with each other in the lifting engagement chain unit 110. Thereby, the buckling restricting plane 116S shares a load acting on the pair of engagement chains 111A and 111B from an upper part to a lower part along the vertical direction and the horizontal component is reduced.

Accordingly, this embodiment enables the lifting engagement chain unit 110 to lift the driven object 120 to a higher position when the pair of engagement chains 111A and 111B are autonomously erected in the vertical direction. This embodiment also ensures the engagement accuracy of the link plates between the hooked inner tooth plates 112 and between the hooked outer tooth plates 113 and improves the buckling strength without increasing the burden of assembling the apparatus without increasing the number of parts and without increasing the cross-sectional area of the pair of integrated and engaged engagement chains 111A and 111B.

Still more, in another embodiment, the buckling restricting plane 116S extends from one engagement chain 111A to the other engagement chain 111B of the pair of engagement chains 111A and 111B along a plate plane 116P of the buckling restricting attachment plate 116 and crosses over a center line CL of the pair of engagement chains 111A and 111B in the condition in which the pair of engagement chains 111A and 111B is integrated by engaging with each other in the lifting engagement chain unit 110.

Thereby, the buckling restricting plane 116S takes the burden of the load and disperses it to both sides of the center line CL of the pair of engagement chains 111A and 111B from one engagement chain 111A to the other engagement chain 111B along the plate plane 116P of the buckling restricting attachment plate 116.

Accordingly, in this embodiment, the lifting engagement chain unit 110 improves the buckling strength of the pair of engagement chains 111A and 111B along the couterface surface S of the pair of engagement chains 111A and 111B even more, so that the driven object 120 can be lifted more accurately in the condition in which the pair of engagement chains 111A and 111B are autonomously erected straightly in the vertical direction. This embodiment also ensures the engagement accuracy of the link plates between the hooked inner tooth plates 112 and between the hooked outer tooth plates 113 without increasing the burden of assembling the apparatus without increasing the number of parts and without increasing the cross-sectional area of the pair of integrated engagement chains 111A and 111B.

Furthermore, in another embodiment, the buckling restricting attachment plate 116 overlaps with the two hooked outer tooth plates 113 contained in the other engagement chain 111B and adjoining in the chain longitudinal direction in the condition in which the pair of engagement chains 111A and 111B are integrated and engaged with each other in the lifting engagement chain unit 110.

In such an embodiment, the buckling restricting attachment plate 116 supports the two buckling restricting attachment plates 116 in the chain width direction W. Accordingly, the lifting engagement chain unit 110 of this embodiment improves the buckling strength of the pair of engagement chains 111A and 111B along the chain width direction W and enables the driven object 120 to be lifted more accurately in the condition in which the pair of engagement chains 111A and 111B are autonomously erected straightly in the vertical direction without increasing the burden of assembling the apparatus and without increasing the number of parts and without increasing the cross-sectional area of the pair of engaged engagement chains 111A and 111B.

In yet another embodiment, the plurality of buckling restricting attachment plates 116 each having the pair of front and rear buckling restricting planes 116S for restricting the buckling along the counter surface S of the pair of engagement chains 111A and 111B is arrayed along the chain longitudinal direction in the condition in which the pair of engagement chains 111A and 111B are integrated and engaged with each other and is attached to the outside of the hooked outer tooth plates 113 of only one engagement chain 111A among the pair of engagement chains 111A and 111B in the lifting engagement chain unit 110 of the present embodiment.

Accordingly, the lifting engagement chain unit 110 of this embodiment can lift the driven object 120 when the pair of engagement chains 111A and 111B are autonomously erected straightly in the vertical direction by restricting the pair of engagement chains 111A and 111B from inclining along the counter surface S of the pair of engagement chains 111A and 111B. The lifting engagement chain unit 110 can also ensure the engagement accuracy of the link plates between the hooked inner tooth plates 112 and the hooked outer tooth plates 113 and can improve the buckling strength without increasing the burden assembling the apparatus, without increasing the number of parts and without increasing the cross-sectional area of the pair of engaged engagement chains 111A and 111B. Thus, the advantageous effects of the lifting engagement chain unit 110 are remarkable.

The specific mode of the lifting engagement chain unit of the present invention may take any mode as long as the lifting engagement chain unit comprises the pairs of hooked inner tooth plates separately disposed in the chain width direction, the hooked outer tooth plates adjacently disposed respectively on the outsides of the pairs of hooked inner tooth plates and the pairs of front and rear link pins for linking the hooked inner tooth plates with the hooked outer tooth plates in the chain longitudinal direction, wherein the pair of engagement chains is constructed by linking the large number of hooked inner tooth plates with the hooked outer tooth plates in the chain longitudinal direction by the link pins. The pair of engagement chains are adapted to be integrated by being disposed so as to face with each other and engage with each other and are also adapted to be separated or branched by being disengaged from each other.

The lifting engagement chain unit further comprises the plurality of buckling restricting attachment plates arrayed along the chain longitudinal direction and each having the pair of front and rear buckling restricting planes that restrict buckling of the chain along the couterface surface of the pair of engagement chains in the condition in which the pair of engagement chains is integrated by being engaged with each other and the buckling restricting attachment plates are attached respectively only to the outside of the hooked outer tooth plates of one engagement chain among the pair of engagement chains. Then, the lifting engagement chain unit can lift the driven object to higher position when the pair of engagement chains is autonomously erected straightly in the vertical direction, can ensure engagement accuracy of the link plates between the hooked inner tooth plates and between the hooked outer tooth plates and can improve buckling strength without increasing the burden assembling the apparatus, without increasing the number of parts and without increasing the cross-sectional area of the pair of engagement chains integrated by engaging with each other.

What is claimed is:

1. A lifting engagement chain unit, comprising:
   a plurality of pairs of hooked inner tooth plates disposed with an interval therebetween in a chain width direction;
   at least two hooked outer tooth plates, each disposed adjacent to and on an outside surface of one of the pairs of hooked inner tooth plates in the chain width direction, such that the plurality of pairs of hooked inner tooth plates are disposed between the two hooked outer tooth plates in the chain width direction;
   a plurality of pairs of front and rear link pins linking the hooked inner tooth plates with the hooked outer tooth plates, the plurality of pairs of front and rear link pins extending in the chain width direction;
   a pair of engagement chains being constructed by linking the plurality of pairs of hooked inner tooth plates with the hooked outer tooth plates in a chain longitudinal direction by the front and rear link pins, wherein said pair of engagement chains include a first engagement chain and another engagement chain which are configured to integrate with each other when disposed so as to face each other and engage with each other as the hooked inner tooth plates and hooked outer tooth plates of each of the pair of engagement chains engage with each other, the pair of engagement chains also being adapted to disengage from each other and separate; and
   a plurality of buckling restricting attachment plates being attached respectively to one of the outside of the hooked outer tooth plates of each of the pair of engagement chains, wherein the plurality of buckling restricting attachment plates are arrayed continuously along the chain longitudinal direction such that each of the buckling restricting attachment plates has a pair of front and rear buckling restricting planes that restrict buckling of the first engagement chain along a corresponding front or rear restricting plane of the other engagement chain of the pair of engagement chains when the pair of engagement chains are engaged with each other.

2. The lifting engagement chain unit according to claim 1, wherein the buckling restricting attachment plates of each engagement chain of the pair of engagement chains are linked and fixed in place by the link pins.

3. The lifting engagement chain unit according to claim 1, wherein the buckling restricting plane extends horizontally when the pair of engagement chains are engaged with each other.

4. The lifting engagement chain unit according to claim 1, wherein the front or rear buckling restricting plane extends from one of the pair of engagement chains to the other engagement chain of the pair of engagement chains along a plate plane of the buckling restricting attachment plate and crosses over a center line of the pair of engagement chains when the pair of engagement chains are engaged with each other.

5. The lifting engagement chain unit according to claim 4, wherein the buckling restricting attachment plate overlaps with an opposing pair of hooked outer tooth plates contained in the other engagement chain and a pair of hooked outer tooth plates which are adjacent to the opposing pair of hooked outer tooth plates in the chain longitudinal direction when the pair of engagement chains are engaged with each other.

6. A lifting engagement chain unit, comprising:
   a first engagement chain and a second engagement chain, each engagement chain including a plurality of chain segments which are linked together by a plurality of link pins, each chain segment comprising:
   a pair of hooked inner tooth plates separately disposed in a chain width direction;
   a pair of outer tooth plates positioned such that the plurality at least two of pairs of hooked inner tooth plates are disposed between the two hooked outer tooth plates in the chain width direction; and
   a buckling restricting attachment plate being attached one outside surface of one of the hooked outer tooth plates,
   wherein the link pins link the pair of inner tooth plates to the pair of outer tooth plates, an adjacent pair of outer tooth plates of an adjacent chain segment in the chain longitudinal direction, and the buckling restricting attachment plate,
   wherein the first and second engagement chains are adapted so as to be integrated with each other when disposed so as to face with each other so that the pair of hooked inner tooth plates and pair of outer tooth plates of each of the first and second engagement chains engage with each other to form an engaged chain, the first and second of engagement chains also being adapted to disengage from each other and separate, and
   wherein the buckling restriction attachment plates of the first engagement chain are formed on an outer surface of the engaged chain in the chain width direction while the buckling restriction attachment plates of the second engagement chain are formed on another outer surface of the engaged chain in the chain width direction, and
   wherein each of the buckling restricting attachment plates each has a pair of front and rear buckling restricting planes that restrict buckling of the engaged chain.

7. The lifting engagement chain unit according to claim 6, wherein the buckling restricting plane extends horizontally in the condition in which the pair of engagement chains are engaged with each other.

8. The lifting engagement chain unit according to claim 6, wherein the buckling restricting plane extends from each of the first and second engagement chain to the other of the first and second engagement chain along a plate plane of the buckling restricting attachment plate and crosses over a center line of the engaged chain in the chain width direction.

9. The lifting engagement chain unit according to claim 8, wherein the buckling restricting attachment plate of each of the first and second engagement chain overlaps with the hooked outer tooth plates and the outer tooth plates of the adjacent chain segment when the pair of engagement chains are engaged with each other.

\* \* \* \* \*